Aug. 22, 1967     J. J. ALLPORT     3,337,760

ELECTRICAL POWER GENERATOR

Filed Oct. 9, 1964     2 Sheets-Sheet 1

JOHN J. ALLPORT
*INVENTOR.*

BY
ATTORNEY

Aug. 22, 1967   J. J. ALLPORT   3,337,760
ELECTRICAL POWER GENERATOR
Filed Oct. 9, 1964   2 Sheets-Sheet 2

INVENTOR
John J. Allport

United States Patent Office 3,337,760
Patented Aug. 22, 1967

3,337,760
ELECTRICAL POWER GENERATOR
John J. Allport, Sunnyvale, Calif., assignor to United Aircraft Corporation, East Hartford, Conn., a corporation of Delaware
Filed Oct. 9, 1964, Ser. No. 402,840
15 Claims. (Cl. 310—13)

The present invention relates to electrical generators and more particularly to a high-peak-power, pulse generator.

Prior art pulse generators employ devices such as capacitors and inductors for electrical energy storage and must be recharged by means of an electrical power source. Normal devices for recharging are batteries, rectifies and the like which have relatively low power-to-weight ratios making them unsuitable for many portable applications.

The present invention, however, provides for the direct conversion of chemical power into electrical power by means of a generator design which has an extremely good power-to-weight ratio. The high-peak-power, pulse generator of the present invention does not employ conventional electrical devices for recharging; instead, each pulse is powered directly by means of energy derived from chemical combustion. The present invention has unique adaptability where high-peak-power electrical energy is necessary for a wide variety of field applications such as welding at remote locations.

Basically, the present invention contemplates a generation of electrical power by means of driving a metal slug through a magnetic field which slug is impelled by the combustion products of a chemical reaction.

It is an object, therefore, of the present invention to permit the direct conversion of chemical energy to electrical power.

It is a further object of the present invention to provide a high-repetition-rate, high-peak-power, electrical pulse generator.

It is still another object of the present invention to provide an alternating current generator capable of unusually high power outputs.

It is another object of the present invention to provide an electric generator possessing extremely low internal impedance.

It is yet another object of the present invention to provide an electrical generator having an exceptionally good power-to-weight ratio.

These, together with the various ancillary objects and features of the invention are realized by passing a metallic slug through a region containing a magnetic field whereby an electrical potential is established across it in accordance with the principles of physics. These and other significant aspects of the present invention will be more readily ascertained upon understanding the invention as described hereinbelow in detail and illustrated in the accompanying drawings wherein.

Figure 1:
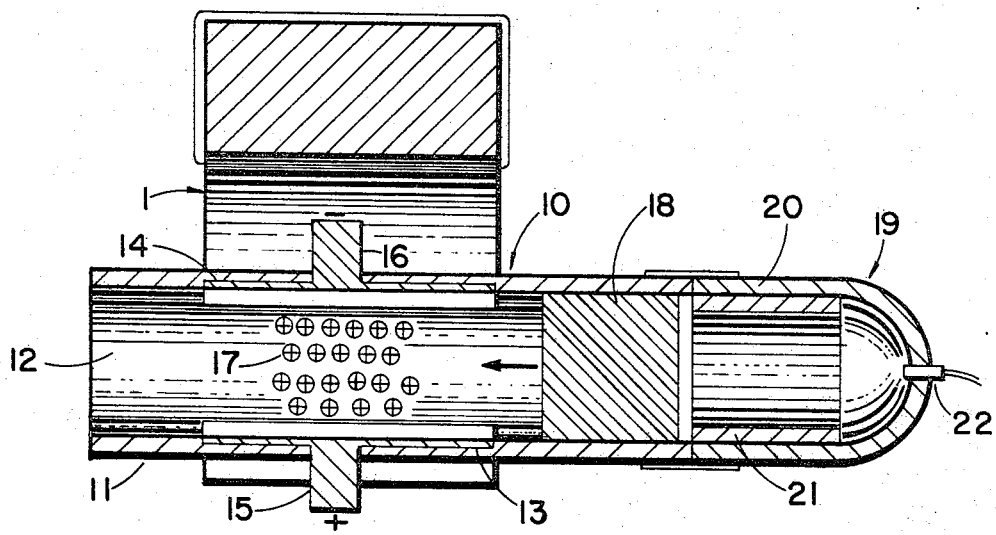
FIG. 1 shows in cross-section the electrical generator unit of the present invention employing a solid rocket grain as a chemical power source.

Referring more particularly to the drawings, and in specific to FIG. 1, an electrical generator unit 10 is provided with a hollow conduit 11 containing an axial bore 12. Flush to the inside surface of conduit 11 are electrical conductors 13 and 14 which are insulated from conduit 11 by any appropriate means such as nonconducting adhesives or strips of laminated insulation. Conductors 13 and 14 are provided with terminals 15 and 16, respectively, for tapping the power generated in unit 10. In order to provide a magnetic field 17 which traverses the bore 12 and which is substantially transverse to the direction of motion of the slug and to the direction of current flow between conductors 13 and 14, appropriate magnetic devices, such as electromagnets, permanent magnets, and solenoid coils are provided in proximity to the electrical generator unit 10. A magnetic field 117 similar to that shown in FIG. 1 is established across the unit 180 by any of the above noted means. Contained within bore 12 is slug 18 which, upon moving across electrical conductors 13 and 14 and through magnetic field 17, generates an electrical potential across said contacts in accordance with the laws of electrodynamics.

In order to propel slug 18 down perforation 12, solid rocket motor 19 is provided which is comprised of casing 20 and solid grain 21. To initiate action, igniter 22 is provided which ignites grain 21 creating a pressure behind slug 18 propelling it down conduit 11 across terminals 15 and 16 whereby a high-energy, electrical pulse is generated whereupon it then passes out into the surrounding atmosphere.

In order to better understand the power levels attainable by means of the present invention, consider the following example: A one-centimeter cube of copper passing down the barrel at a velocity of 1,000 meters per second through a one weber per square meter magnetic field (10,000 gauss) develops an open circuit potential of ten volts and delivers three million amperes to a matched load. The slug traveling at a constant velocity of 1,000 meters per second would traverse one meter in $10^{-3}$ seconds, thus a pulse length of $10^{-3}$ seconds would require a barrel one meter long, approximately the length of a .50 caliber rifle or machine gun.

Figure 8:
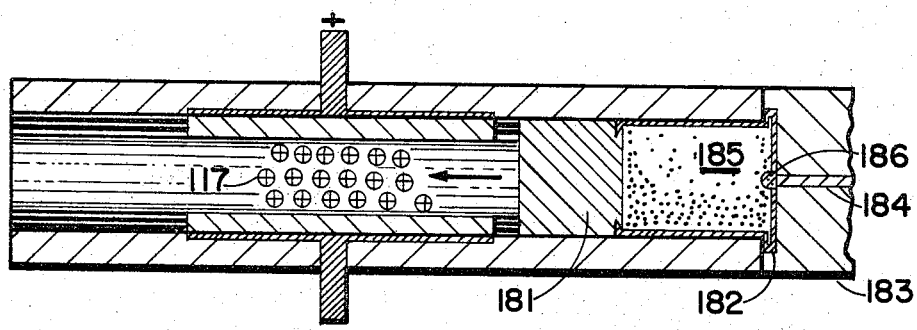
FIG. 8 shows a cross-sectional view of a generator of the present invention using a cartridge as a slug-motivating means.

As shown in FIG. 8, the electric generator unit 180 may be designed to accept a cartridge similar to a rifle cartridge comprised of slug 181 and loaded cartridge 182. The powder contained within cartridge 182 is ignited by conventional primer set off by firing pin 184 contained in a conventional bolt or breech block 183. Consequently, the present invention may be made to repetitively generate high-energy, electrical pulses in the same fashion as a machine gun or Gattling gun.

Conduit means 11 as shown in FIG. 1 may have a varied cross-sectional design. At FIG. 2, the section II—II of FIG. 1 is shown to possess a design suitable for the practice of the present invention. In this instance, the conduit 11 is cylindrical and is comprised of an outer portion 11 which is metallic and layer 25 consisting of an insulating medium. Imbedded in the insulation 25 are conductors 13 and 14 which are flush to the inside surface of said insulation. The insulation is provided with ridges or lands in order to guide the slug down the barrel without twisting and, likewise, the electrical conductors 13 and 14 are provided with lands 27.

Figure 2:
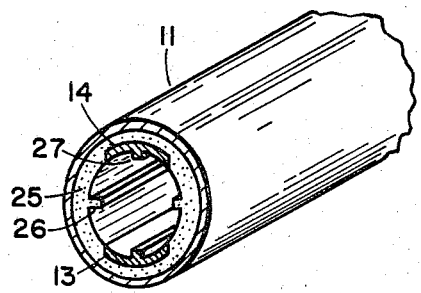
FIG. 2 is a cross-sectional view of one embodiment of FIG. 1 along sectional lines II—II.
Figure 4:
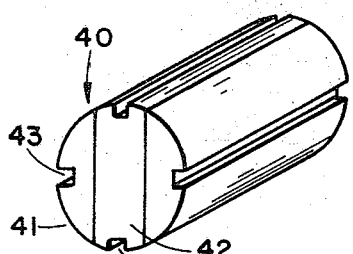
FIG. 4 shows one preferred embodiment of a metallic slug for use in the present invention.

A slug suitable for use in the barrel design of FIG. 2 is shown in FIG. 4. Although the entire slug 40 may be made up of a metal, it can be formed in three sections with center section 42 made from a good conductor such as copper. The metal slug 42 is then flanked on each side by a plastic or nonconducting portion 41 and the three portions are joined together by appropriate means such as glueing or press fitting. Plastic portion 41 has a groove 43 to mesh with the ridge 26 of the barrel as shown in FIG. 2. Likewise, metallic portion 42 has a groove 44 for mating with ridge 27 as shown in FIG. 2. Since the voltage generated across terminals 16 and 15 of FIG. 1 is a direct function of the height of slug 18, it is necessary to increase slug height where relatively high voltages are desired. Also, the current output of the slug is a direct function of the contact surface area between the slug and the conductors, so the slug need only be as wide as the conductors. Consequently, if a relatively high voltage is to be produced in a cylindrical barrel, the design of FIG. 4 offers optimum current output at the desired voltage.

Figure 3:
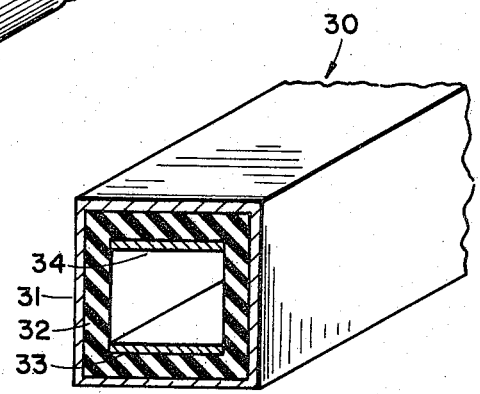
FIG. 3 shows an alternative cross-sectional view of FIG. 1 along section lines II—II.

An alternative cross-section along section lines II—II of FIG. 1 is shown in FIG. 3. Here the barrel 11 has a rectangular cross-section with an outside layer 31 made from a high-strength material such as nonmagnetic stainless steel. It is important to note at this point that barrel materials should be nonmagnetic, ruling out the use of ferromagnetic alloys of iron, nickel and cobalt. Inside the nonmagnetic outer portion 31, an insulator material 32 is provided in order to prevent shorting of electrical contacts 33 and 34.

Figure 5:
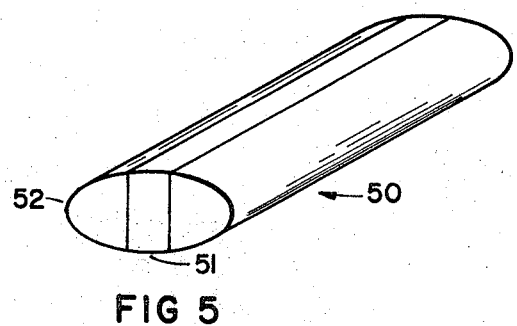
FIG. 5 shows an alternative design of a metallic slug for use in the power generating systems of the present invention.
Figure 6:
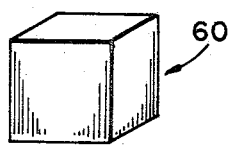
FIG. 6 shows a cubical metallic slug suitable for use in a generator having a cross-section similar to that shown in FIG. 3.
Figure 7:
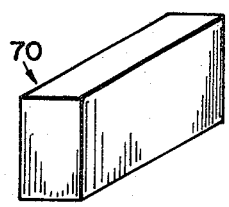
FIG. 7 shows a cross-sectional view of an alternative embodiment of a solid metallic slug.

An appropriate slug for use in barrel 30 of FIG. 3 is the simple cubic slug 60 as shown in FIG. 6. This slug, as it passes through the barrel, will create a rapidly rising pulse, and as it passes along the conductors 33 and 34 of FIG. 3, it will maintain a relatively constant power output as long as the velocity is substantially constant. However, in the event greater peaking is desired, an elongated metal slug may be used as shown in FIG. 7. Here metal slug 70, as it passes across conductors 33 and 34 of FIG. 5 creates maximum power output only as long as the entire slug is in contact with the conductors 33 and 34. As soon as either end of slug 70 extends over the ends of conductors 33 and 34, the power output will be decreased. If the slug is as long as the conductors, a high peak pulse with no plateau will result.

In the event it is desired to do away with the ridges or lands 26 and 14 as shown in FIG. 2, an elliptical slug as shown in FIG. 5 may be used. Elliptical slug 50 is used conjunction with an appropriately designed elliptical barrel, the dimensions of which will be obvious from the aforementioned teachings. Again, the preferred embodiment of an elliptical slug would require the use of a metallic portion 51 and flanking plastic portions 52 in order to produce relatively high voltages.

Figure 9:
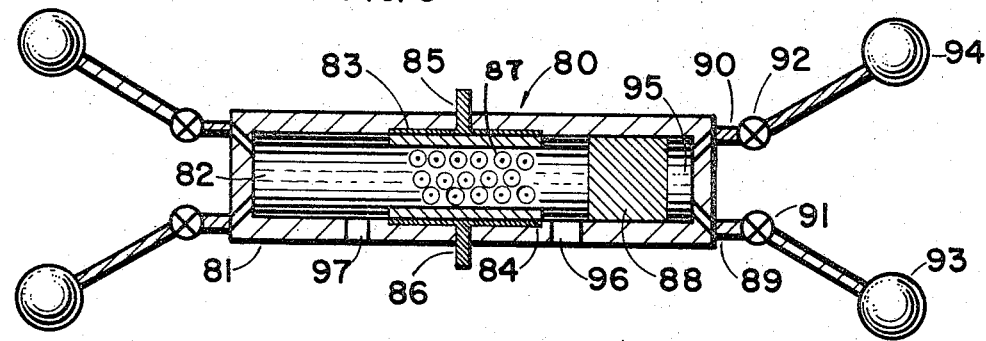
FIG. 9 shows in cross-section an embodiment of the present invention wherein the metallic slug moves reciprocally to produce alternating current.

All the aforementioned embodiments of the present invention produce pulses of direct current either on a one-shot basis or repetitively by means of using rapid fire cartridges as shown in FIG. 8. However, it is possible to generate alternating current by means of the concepts of the present invention by using a reciprocating combustion unit as shown in FIG. 9. Here the generator 80 is comprised of casing 81 which contains bore 82. Conductors 83 and 84 are flush with the surfaces of bore 82 and insulated by any appropriate means from case 81 in order to prevent shorting and are provided with terminals 85 and 86 respectively. As previously discussed, an appropriate magnetic field 87 must be provided which traverses the bore 82 and is substantially non-normal to conductors 83 and 84 so that the field is substantially transverse to the direction of motion of slug 88 and to the direction or current flow between conductors 83 and 84. Slug 88 is designed to fit snugly in void 82 and may be provided with appropriate sealing devices such as piston rings, not shown. The end wall of chamber 81 and slug 88 define cavity 95 wherein combustion takes place for propulsion of slug 88 to the left. This is accomplished by opening valves 91 and 92 whereupon fuel in 93 and oxidizer in tank 94 pass through conduits 88 and 90 into combustion chamber 95. If the materials are hypergolic, ignition takes place spontaneously forming high temperature, high pressure combustion products which impel slug 88 at a high velocity across conductors 83 and 84 thereby generating electrical power. In the event the liquids contained in tanks 93 and 94 are nonhypergolic, an appropriate ignition means such as a spark plug or diesel injectors may be provided.

In order to avoid the compression of gases in chamber 82 which would slow down the movement of slug 88, vent 97 is provided whereby any decrease in velocity of slug 88 is due only to friction and the converson of kinetic energy into electrical power. As slug 88 continues to the left past vent 97, the gases contained therein are compressed and the slug then stops just short of the left end of the chamber 81 and a cavity is formed there similar to that of 95. Internal combustion is created in a similar manner and the cycle is repeated. However, the slug 88 as it passes from left to right generates electrical impulse of opposite polarity of the first impulse, and, as a result, generates an alternating current. In order to avoid the compression problems mentioned before, vent 96 is provided.

It is evident that a free piston engine containing electrical conductors such as 84 and 83 at the central portion thereof will, likewise, result in the generation of alternating current. Accordingly, it is to be understood that the specific embodiments of the invention herein disclosed are of a descriptive, rather than limiting nature, and that various changes, combinations, substitutions or modifications may be employed in accordance with these teachings without departing either in spirit or scope from this invention in its broader aspect.

I claim:

1. An electric generator comprised of at least two opposing, electrically-conductive contacts separated by a predetermined distance, a metallic slug having sliding relationship with all of said opposing contacts, means for propelling said metallic slug across said contacts and means for creating a magnetic field between said contacts, which field is substantially transverse to the direction of motion of said slug and substantially non-normal to said contacts whereby an electromotive force is produced across said contacts.

2. An electric generator comprised of two elongated, opposing electrical contacts separated by a predetermined distance, a metallic slug in sliding relationship with said opposing contacts, means for propelling said metallic slug across said contacts and means for creating a magnetic field between said contacts, which field is substantially transverse to the direction of motion of said slug and substantially non-normal to said conductors whereby an electromotive force is produced across said contacts.

3. An electric generator comprised of an elongated conduit having a central perforation, at least two separate, opposing electrical contacts on the inside surface of said conduit, a metallic slug having sliding relationship with said electrical contacts, means for propelling said metallic slug along said electrical contacts and in contact therewith, and means for generating a magnetic field between said contacts, which field is substantially transverse to the motion of said slug and substantially non-normal to said contacts whereby an electromotive force is produced across said contacts.

4. An electric generator comprised of an elongated conduit having a central perforation, two elongated, opposing electrical contacts on the inside surface of said conduit, a metallic slug having sliding relationship with said electrical contacts, means for propelling said metallic slug along said elongated electrical contacts in electrical contact therewith and means for generating a magnetic field between said contacts which field is substantially transverse to the direction of motion of said slug and substantially non-normal to said contacts whereby an electromotive force is produced across said contacts.

5. An electric generator comprised of an elongated hollow cylinder saving a central perforation therethrough, at least two opposing electrical contacts located on the inside surface of said cylinder, a cylindrical metallic slug having an outside diameter substantially identical to the inside diameter of said elongated cylinder, means for propelling said metallic slug across the surface of said contacts, and means for creating a magnetic field between said contacts which field is substantially transverse to the direction of motion of said slug and substantially non-normal to said contacts whereby an electromotive force is produced across said contacts.

6. An electric generator comprised of an elongated hollow cylindrical conduit having a central perforation, two opposing electrical contacts on the inside surface of said cylinder, a cylindrical metallic slug having an outside diameter substantially identical to that of the inside diameter of said elongated hollow cylinder and in sliding relationship with said electrical contacts, means for propelling said electrical conductor along said perforation and across the surfaces of said electrical contacts and means for generating a magnetic field between said contacts which field is substantially transverse to the direction of motion of said slug and substantially non-normal to said contacts whereby an electromotive force is produced across said contacts.

7. An electric generator as in claim 6 wherein said metallic slug has a portion thereof which is non-metallic.

8. An electric power generator comprised of a hollow conduit of rectangular cross-section, at least two separate opposing electrical contacts on opposing inside surfaces of said hollow, rectangular conduit, a metallic slug having a cross-section substantially identical to the internal cross-section of said hollow, rectangular conduit and in sliding relationship with said opposing electrical contacts, means for propelling said metallic slug across said contacts and means for creating a magnetic field between said contacts which field is substantially transverse to the direction of motion of said slug and substantially non-normal to said contacts whereby an electromotive force is produced across said contacts.

9. An electrical generator as in claim 1 wherein the means for propelling said metallic slug is a solid rocket motor.

10. An electric power generator as in claim 1 wherein said means for propelling said metallic slug is a firearm explosive charge.

11. An electric generator as in claim 1 wherein said means for propelling said metallic slug is the combustion products of an internal combustion device.

12. An electric generator as in claim 1 wherein a second means for propelling said metallic slug is provided in order to reverse the motion of said slug to create an electromatic force in said contact of opposite polarity.

13. An electric pulse generator comprising an elongated hollow conduit, opposing electrical contacts mounted within said conduit substantiallly flush with the internal surface of said conduit, said contacts being electrically insulated from each other, a metallic slug within said conduit, said slug being in sliding contact with the internal surface of said conduit, means for moving said slug through said conduit and across said opposing contacts whereby said contacts are in electrical conducting relationship during the passage of said slug thereacross, means for generating a magnetic field between said contacts, said mangetic field being substantially transverse to both the direction of motion of said slug and to a plane parallel to said direction of motion and perpendicular to said contacts, whereby an electromotive force is produced across said contacts upon passage of said slug through said magnetic field and across said contacts.

14. The pulse generator of claim 13 further comprising means for connecting said contacts to a load.

15. The pulse generator of claim 14 wherein said metallic slug is nonmagnetic.

References Cited
UNITED STATES PATENTS

| | | | |
|---|---|---|---|
| 2,544,077 | 3/1951 | Gardner | 310—15 |
| 2,870,675 | 1/1959 | Salisbury | 310—14 X |
| 2,899,565 | 8/1959 | Turner | 290—1 |
| 2,904,701 | 9/1959 | Colgate | 290—1 |
| 3,257,905 | 6/1966 | Weisman et al. | 310—14 X |
| 3,259,769 | 7/1966 | Stott | 310—14 |

MILTON O. HIRSHFIELD, *Primary Examiner.*

D. F. DUGGAN, *Assistant Examiner.*